(12) United States Patent
Zoller et al.

(10) Patent No.: US 7,081,904 B2
(45) Date of Patent: Jul. 25, 2006

(54) METHODS AND APPARATUSES FOR IDENTIFYING REMOTE AND LOCAL SERVICES

(75) Inventors: David Ethan Zoller, Seattle, WA (US); Adam J. Overton, Redmond, WA (US); Nadim Y. Abdo, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 382 days.

(21) Appl. No.: 10/087,552

(22) Filed: Feb. 26, 2002

(65) Prior Publication Data

US 2003/0160816 A1    Aug. 28, 2003

(51) Int. Cl.
*G09G 5/00*    (2006.01)

(52) U.S. Cl. .................. 345/661; 345/619; 715/716

(58) Field of Classification Search ............... 345/157, 345/158, 159, 581, 427, 428, 661, 619, 594, 345/676; 717/125, 126, 127, 109; 715/736, 715/35, 700, 716, 701, 719, 733, 750, 762, 715/804, 797

See application file for complete search history.

(56) References Cited

U.S. PATENT DOCUMENTS

| 5,673,403 | A  | * | 9/1997  | Brown et al. ............... 345/744 |
| 6,259,449 | B1 | * | 7/2001  | Saxena et al. ............. 345/853 |
| 6,266,571 | B1 | * | 7/2001  | Fado et al. .................. 700/94 |
| 6,292,187 | B1 | * | 9/2001  | Gibbs et al. ............... 345/804 |
| 6,459,441 | B1 | * | 10/2002 | Perroux et al. ............ 715/837 |
| 6,611,276 | B1 | * | 8/2003  | Muratori et al. ........... 715/772 |
| 6,765,590 | B1 | * | 7/2004  | Watahiki et al. ........... 715/716 |

* cited by examiner

*Primary Examiner*—Richard Hjerpe
*Assistant Examiner*—Abbas Abdulselam
(74) *Attorney, Agent, or Firm*—Lee & Hayes, PLLC

(57) ABSTRACT

Methods and apparatuses are provided for use in local/remote session computing environments. The methods and apparatuses allow users to be more alert as to which graphical user interface (GUI), e.g., local or remotely based, they are viewing and interacting with. When a remote GUI is displayed in full screen mode, one or more identifiers are presented to identify that the GUI is part of a particular local and/or remote program/session. The identifier(s) may be selectively displayed depending on the user's requirements.

65 Claims, 6 Drawing Sheets

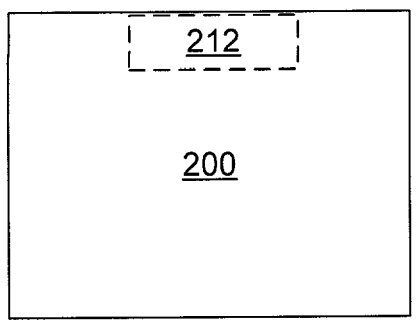
(A)
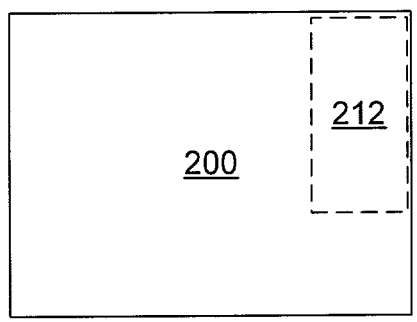
(B)
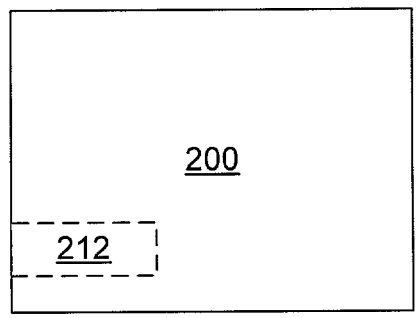
(C)
Fig. 4
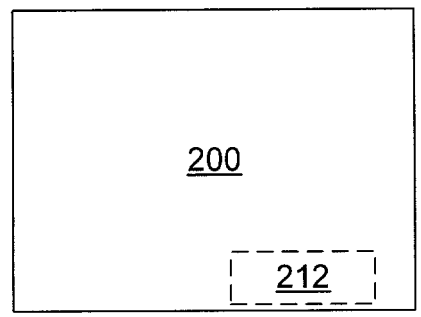
(D)
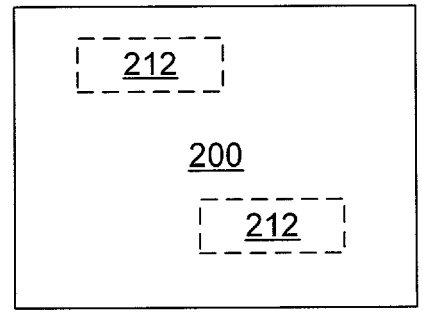
(E)

METHODS AND APPARATUSES FOR IDENTIFYING REMOTE AND LOCAL SERVICES

TECHNICAL FIELD

This invention relates to computers and more particularly to methods and apparatuses for identifying to a user of a local computing device that certain local computing device based services and/or remote computing device based services are providing the graphical user interface (GUI) shown on a local display screen(s).

BACKGROUND OF THE INVENTION

Most of the personal computers (PCs) and other like computing devices in service today present the user with an interactive graphical user interface (GUI) on a display screen. One type of GUI, which is associated with operating systems, is a "desktop" GUI. Through a desktop GUI a user can interactively select graphical icons, etc., as needed to use the computer's resources. For example, the user might selectively activate a program application, peruse the contents of a data storage device, or perhaps initiate communication with a remotely located computing device. Many of the selections may themselves cause other GUIs to be opened on the desktop and displayed.

There is a movement underway to provide locally located users with the ability to be presented with (and interact with) a desktop or other GUI that is actually associated with another computing device that is remotely located, but operatively connected to a local computing device.

Thus, for example, a user that is located away from their business' PC may nevertheless access the business PC desktop through another PC, such as a home PC that is configured to communicate with the business' PC. Here, the user initiates a remote desktop connection through some program. By way of example, in certain exemplary operating systems a Terminal Services Client program may be used. The remote desktop connection program essentially opens up the business PC's desktop GUI on the home PC's display screen.

In this situation and others like it, many users prefer to have the remote desktop GUI opened up fully on the display screen, such that it more closely resembles the desktop GUI that they normally work with. Thus, in the previous example, the user at home would see his/her business PC's desktop as if he/she were actually at work rather than at home. Providing a full remote desktop display not only provides familiarity to the user, but also prevents users from being confused by the potential of seeing two objects/icons that appear to be the same but are actually associated with different desktop GUIs. Moreover, a substantially full screen remote desktop GUI takes advantage of often precious display screen real estate.

One of the drawbacks to having a full screen remote desktop GUI (or other type of GUI) is that some users may forget which computing device, i.e., local or remote, they are viewing and interacting with. Consequently, inexperienced users may, for example, misplace files and/or quickly become frustrated when they cannot locate certain files/programs.

For these reasons and others, there is a need to provide users with a mechanism to identify which desktop or other like substantially full screen GUI they are viewing and/or interacting with.

SUMMARY OF THE INVENTION

Methods and apparatuses are provided which visually identify a desktop or other graphical user interface (GUI) as being associated with a session or other like process operating on a particular computing device.

For example, in accordance with certain aspects of the present invention, a method is provided, which includes displaying a first GUI on a display screen and a second GUI over the first GUI. Here, the first GUI is associated with a program running on a first computing device and the second GUI is associated with a program running a second (e.g., remote) computing device. In accord with the method, the second GUI is displayed on substantially the full screen of the display screen and includes at least one identifier that identifies that the second GUI is not associated with the first computing device. In certain implementations, for example, the first and/or second GUI may include a desktop GUI associated with an operating system, or perhaps an application GUI associated with an application program. In certain other implementations the identifier is selectively displayed for a defined period of time and then no longer displayed until and unless reactivated/re-displayed in some manner either based on some logic (e.g., a timer) and/or perhaps the user's activity within the displayed GUI. In certain further implementations, for example, the identifier may be reactivated/re-displayed based on user keyboard/keypad input(s), special hardware button input(s), and the like. In still other implementations, the identifier may be selectively reactivated/re-displayed by logic operating on the remote computing device.

In accordance with certain further aspects of the present invention, a system is provided which includes a first computing device that is coupled to a display screen and also to a second computing device, e.g., through at least one interconnecting communication link. The first computing device is configured to display a first GUI on the display screen. Here, the first GUI is associated with a program running on the first computing device. The second computing device is configured to display a second GUI on the display screen over the first GUI. The second GUI is associated with a program operatively configured on the second computing device. To alert the user to that fact, the second GUI includes at least one identifier that identifies that the second GUI is not associated with the first computing device.

The above stated needs and others are also met by an apparatus that includes a computing device. Here, the computing device is capable of being operatively connected to at least one other computing device through an interconnecting communication channel. The computing device is configured with logic that generates GUI data suitable for display on a display screen coupled to the other computing device. If displayed on the display screen, the GUI data is configured to use substantially the full area of the display screen. As such, the GUI data advantageously also includes data for displaying at least one identifier that identifies that the GUI data is associated with the logic of the computing device as opposed to the other computing device.

associated with different computing devices and/or sessions, in accordance with certain implementations of the present invention.

Figure 2:
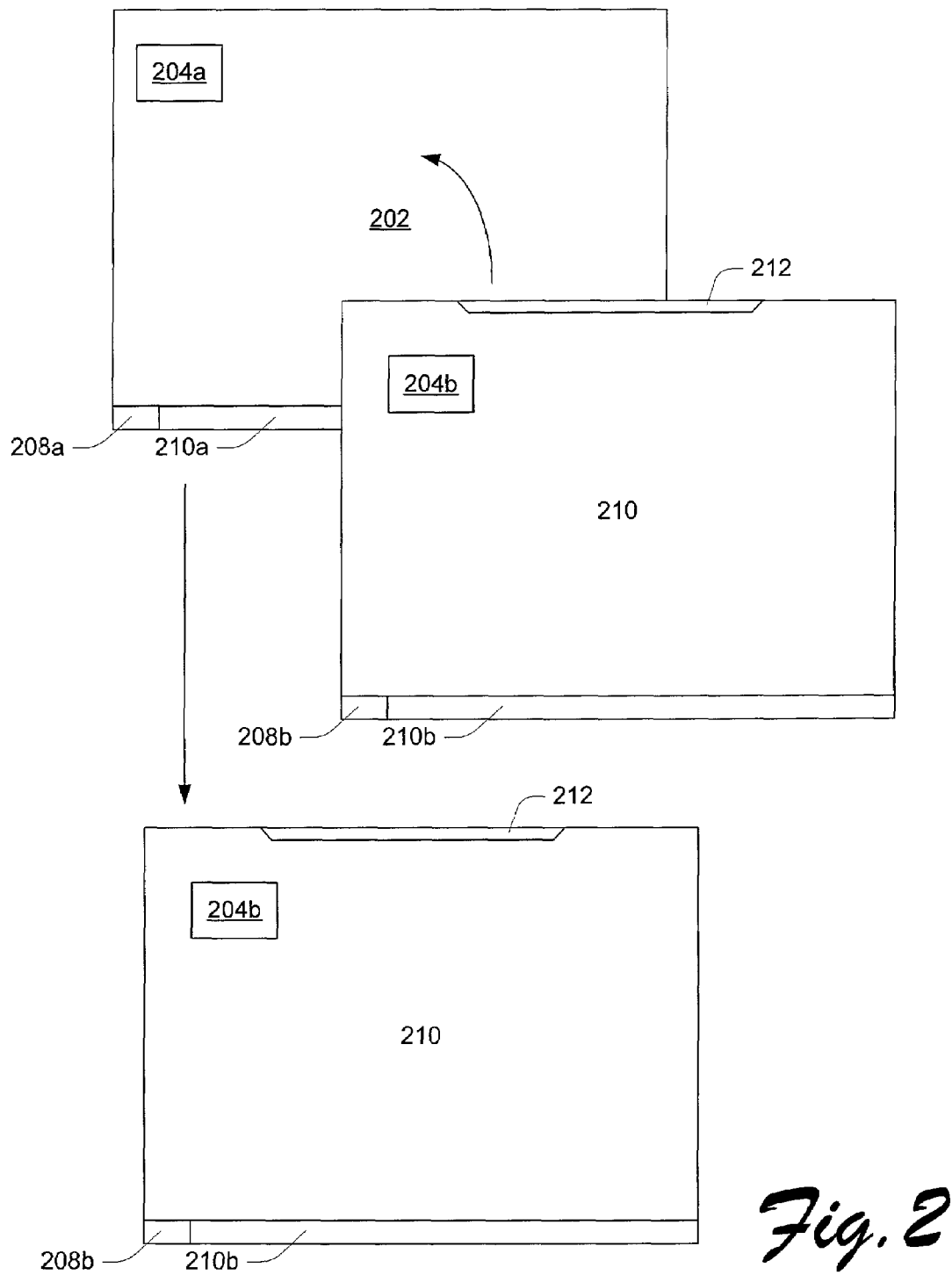

FIG. 2 is an illustrative diagram depicting the presentation of a second graphical user interface (GUI) over an initial GUI, wherein the second GUI includes at least one identifier that selectively alerts the user that the GUI currently being displayed is the second GUI rather than the initial GUI, in accordance with certain exemplary implementations of the present invention.

Figure 3A:
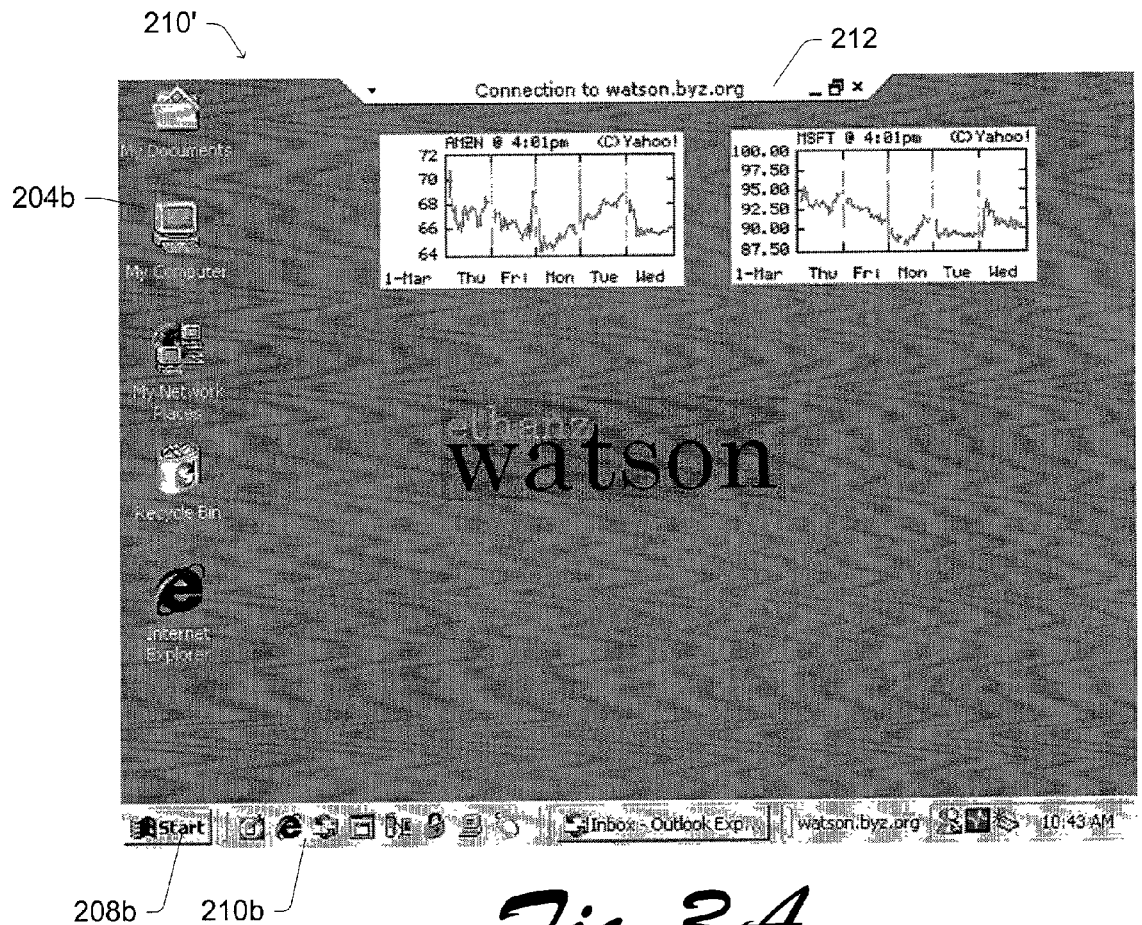

FIG. 3A is an illustrative screen shot showing a desktop associated with a second graphical user interface (GUI) and an identifier that selectively alerts the user that the GUI currently being displayed is associated with a particular computing device and/or session, in accordance with certain exemplary implementations of the present invention.

Figure 3B:
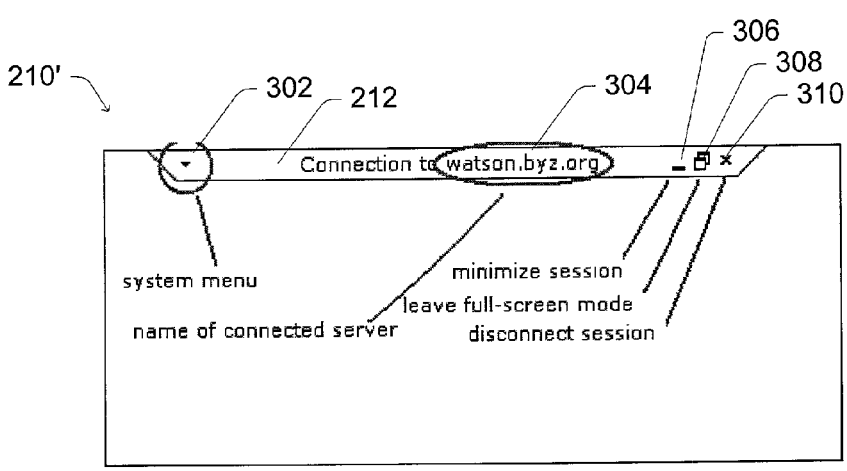

FIG. 3B illustrates certain features of the exemplary identifier of FIG. 3A, in accordance with certain implementations of the present invention.

Figure 3C:
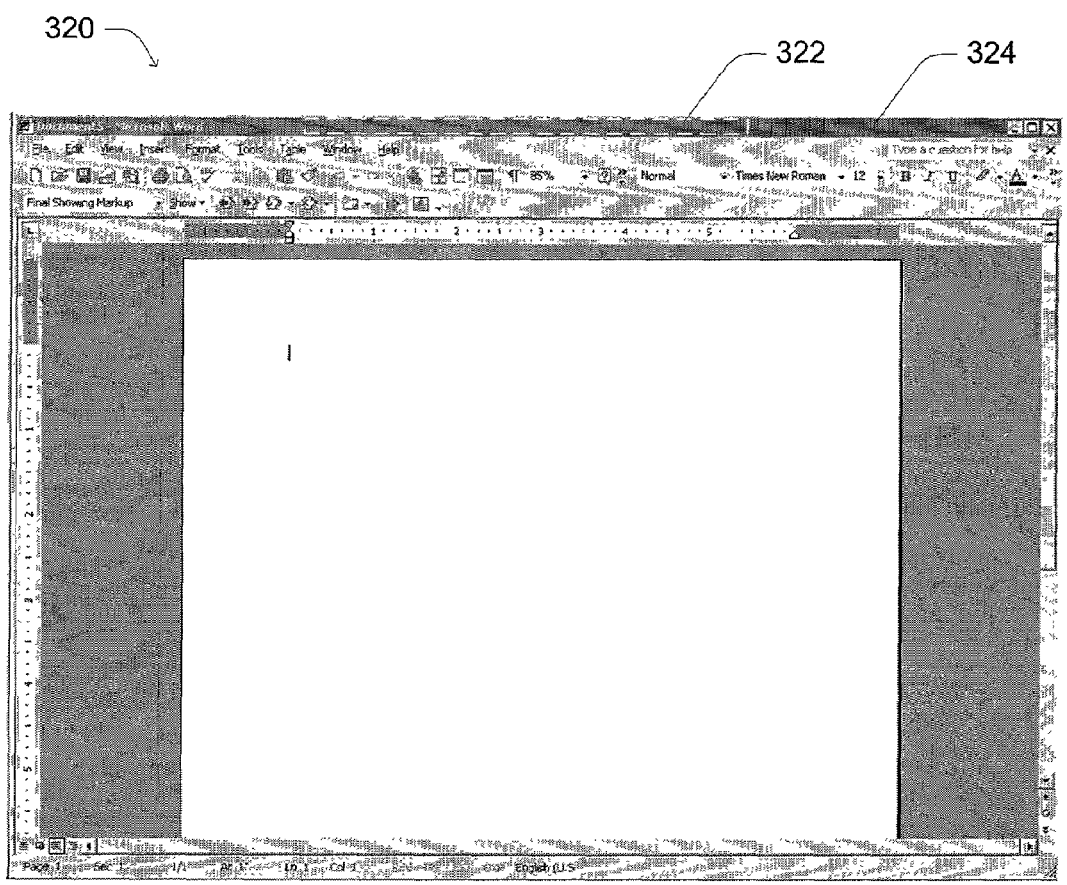

FIG. 3C is an illustrative screen shot showing an opened substantially full-screen graphical user interface (GUI) of a word processor application program that has further been highlighted to depict one exemplary location within the GUI that an identifier, for example, as in FIGS. 2, 3A, and/or 3B, may be located and/or selectively displayed to alert the user that the GUI currently being displayed is associated with a particular computing device and/or session, in accordance with certain exemplary implementations of the present invention.

FIGS. 4A–E are block diagrams illustrating that one or more identifiers may be located at various positions within a graphical user interface (GUI) and configured to selectively alert the user that the GUI currently being displayed is associated with a particular computing device and/or session, in accordance with certain exemplary implementations of the present invention.

Figure 5:
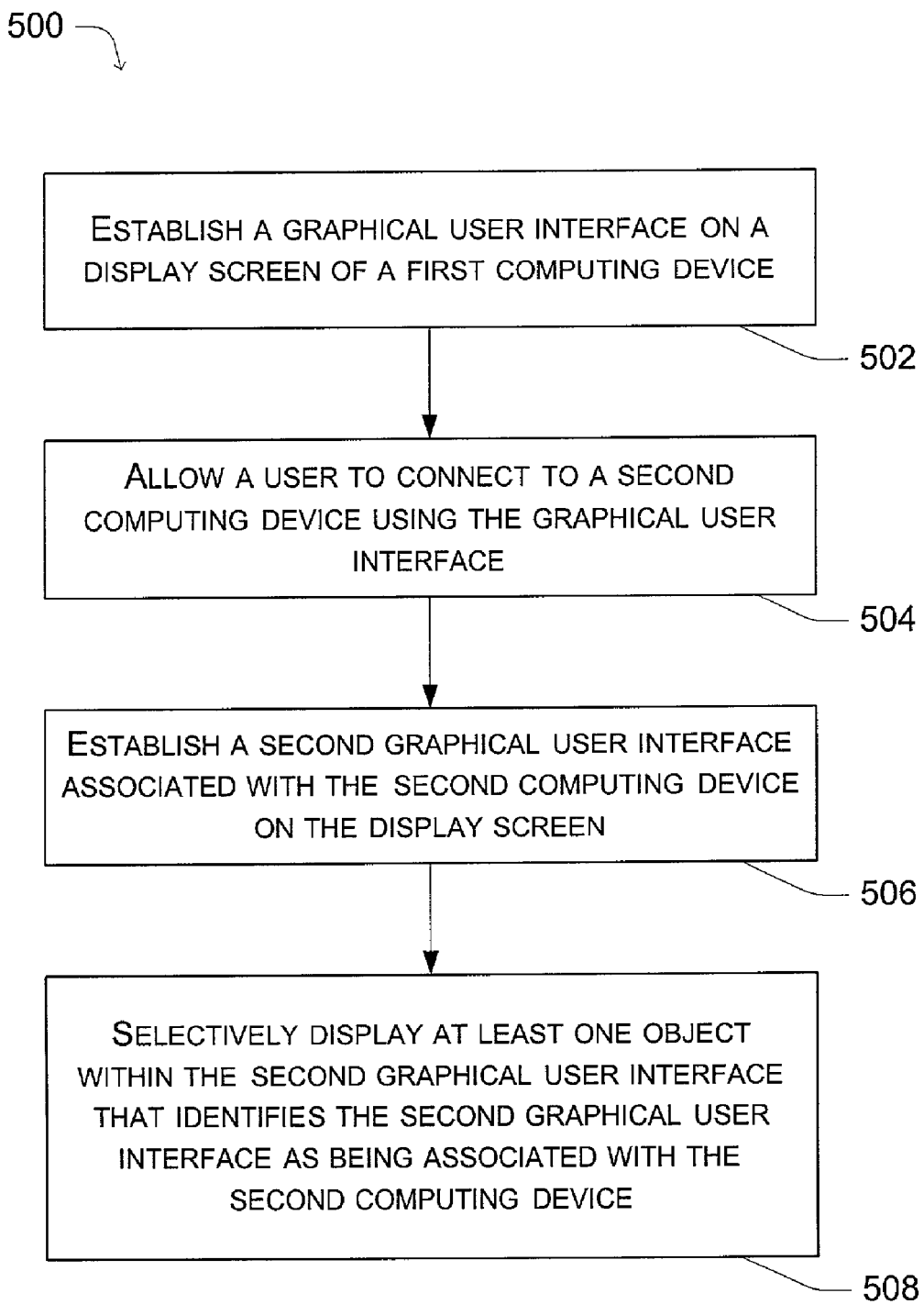

FIG. 5 is a flow diagram depicting a method for selectively alerting a user that a GUI currently being displayed is associated with a particular computing device and/or session, in accordance with certain exemplary implementations of the present invention.

DETAILED DESCRIPTION

Figure 1:
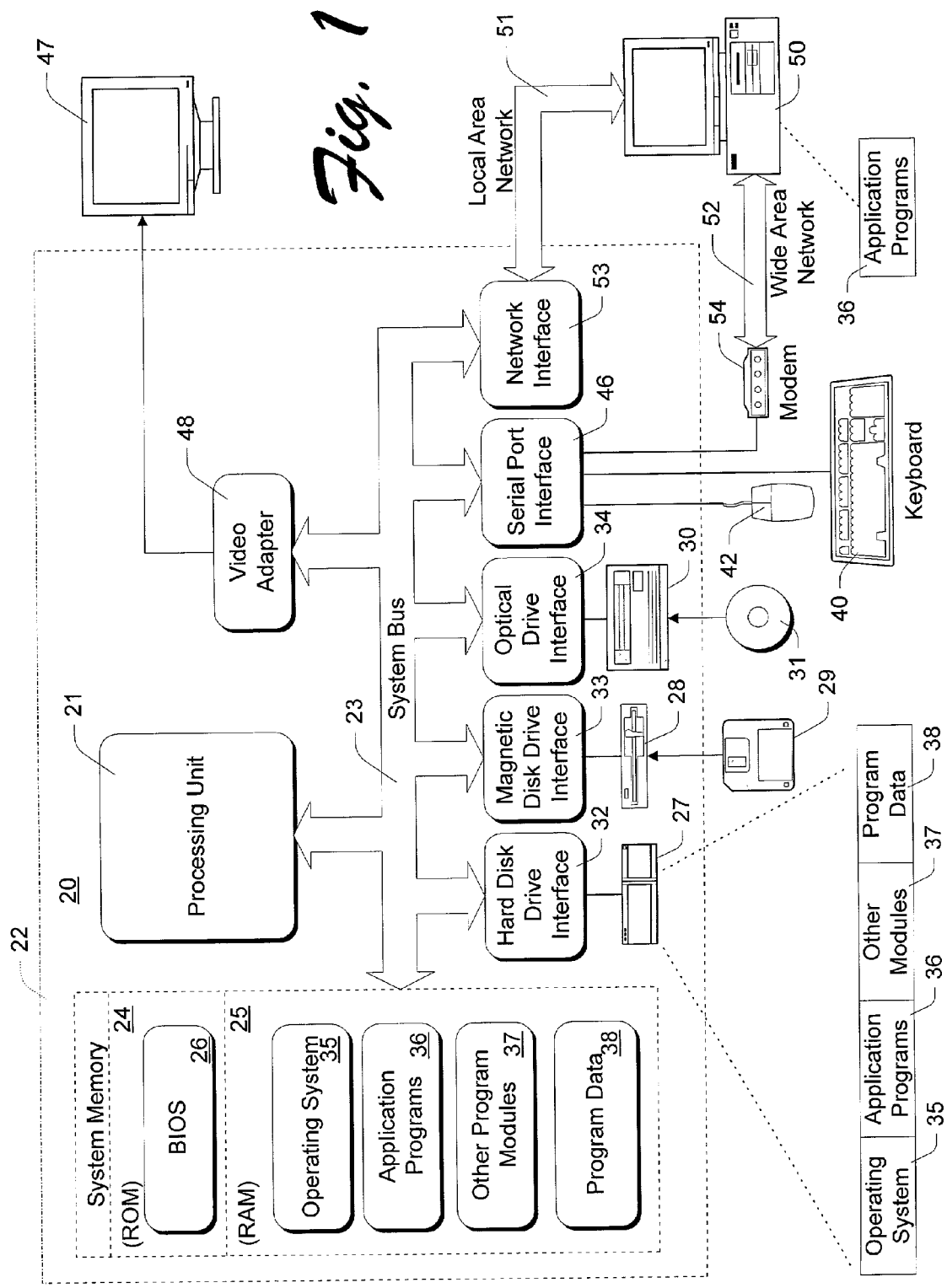
FIG. 1 is a block diagram of an exemplary computing device and computing environment capable of presenting a user with a plurality of graphical user interfaces (GUIs)

Exemplary Computing Environment:

As shown in FIG. 1, computer 20 includes one or more processors or processing units 21, a system memory 22, and a bus 23 that couples various system components including the system memory 22 to processors 21. Bus 23 represents one or more of any of several types of bus structures, including a memory bus or memory controller, a peripheral bus, an accelerated graphics port, and a processor or local bus using any of a variety of bus architectures.

The system memory includes read only memory (ROM) 24 and random access memory (RAM) 25. A basic input/output system (BIOS) 26, containing the basic routines that help to transfer information between elements within computer 20, such as during start-up, is stored in ROM 24.

Computer 20 further includes a hard disk drive 27 for reading from and writing to a hard disk, not shown, a magnetic disk drive 28 for reading from and writing to a removable magnetic disk 29, and an optical disk drive 30 for reading from or writing to a removable optical disk 31 such as a CD ROM, DVD ROM or other optical media. The hard disk drive 27, magnetic disk drive 28 and optical disk drive 30 are each connected to bus 23 by applicable interfaces 32, 33 and 34, respectively.

The drives and their associated computer-readable media provide nonvolatile storage of computer readable instructions, data structures, program modules and other data for computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into computer 20 through input devices such as keyboard 40 and pointing device 42. Other input devices (not shown) may include a microphone, joystick, game pad, satellite dish, scanner, or the like. These and other input devices are connected to the processing unit 21 through an interface 46 that is coupled to bus 23.

A monitor 47 or other type of display device is also connected to bus 23 via an interface, such as a video adapter 48. In addition to the monitor, personal computers typically include other peripheral output devices (not shown) such as speakers and printers.

Computer 20 can operate in a networked environment using logical connections to one or more remote computers, such as a remote computer 50. Remote computer 50 may be another personal computer, a server, a router, a network PC, a peer device or other common network node, and typically includes many or all of the elements described above relative to computer 20. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, computer 20 is connected to the local network 51 through a network interface or adapter 53. When used in a WAN networking environment, computer 20 typically includes a modem 54 or other means for establishing communications over the wide area network 52, such as the Internet. Modem 54, which may be internal or external, is connected to bus 23 via interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Exemplary Remote Desktop GUI Having an Identifier Feature:

Reference is now made to FIG. 2, which is an illustrative diagram depicting the display of two different graphical user interfaces (GUIs) associated with two different computing devices and/or sessions. This example uses desktop GUIs associated with operating systems. Those skilled in the art will recognize that the methods and apparatuses described herein are also fully applicable to other types of GUIs and in particular GUIs that make use of substantially all of the available display screen area.

As shown, a first desktop GUI 202 is the first GUI to be displayed to the user of computer 20 on display 47 (see FIG. 1). Here, first desktop GUI 202 is associated with operating system 35 of PC 20 and an open session running thereon. In this exemplary arrangement, first desktop GUI 202 includes at least one desktop object 204*a*, a start button 208*a* and a task bar 210*a*.

In FIG. 2, the user selectively begins a session with remote computer 50, which, as demonstrated in FIG. 1, can be operatively connected to computer 20. This remote session can be accomplished, for example, through various types of terminal server or other like software applications/modules operating on computers 20 and 50; such capabilities are well-known. As a result of this user initiated remote session, a second desktop GUI 210 associated with remote computer 50 is displayed to user on display 47 instead of (e.g., over) first desktop GUI 202. The illustrative arrows depict the switching of desktop GUIs as a result of the remote session being started. Note that the exemplary desktop GUIs are opened in a full screen mode or at least a substantially full screen mode.

As illustrated at the bottom of FIG. 2 the resulting second desktop GUI 210, which is associated with operating system or other like software running on remote computer 50, has many similar features to first desktop GUI 202. For example, second desktop GUI 210 may include: one or more desktop objects 204*b*, such as, e.g., a file or folder icon, etc.; a start button 208*b* to allow the user to initiate some action, such as, e.g., launch a program application, etc.; and, a task bar 210*b* that depicts certain files, actions, programs, etc., associated with the user's session.

If first desktop GUI 202 and second desktop GUI 210 appear too much alike, then the user may be confused about which GUI they are viewing and interacting with and therefore which computer/session they are actually using. To prevent this and other potential problems from occurring, second desktop GUI 210 further includes an identifier 212 that alerts the user that second desktop GUI 210 is associated with remote computer 50 and/or not computer 20. In this exemplary implementation, identifier 212 is located near the top center of second desktop GUI 210. This is one potential position for identifier 212. In other implementations, identifier 212 may be in other locations and may occupy more that one area within second desktop GUI 210. Some examples are shown in FIGS. 4A–E, wherein a generic GUI 200 includes one or more identifiers 212 arranged at various locations.

The location, shape, color, information, and/or any other visual characteristics associated with identifier 212 may depend on the type of GUI in which it is being displayed.

Reference is now made to FIG. 3A. In this exemplary screen shot a second desktop GUI 210' is depicted as having an identifier 212 in the form of a "connection bar" which is displayed near the center at the top portion of the desktop space. The connection bar identifier 212 in this example is preferably visibly different than the surrounding GUI displayed area, so the user will hopefully be alerted/aware of the fact that the displayed GUI 210' is associated with a connected session/device and/or not local computing device 20.

In accordance with certain further aspects of the present invention, the displaying of identifier 212 may be selectively controlled. For example, in certain implementations the connection bar identifier 212 in FIG. 3A may be displayed for a certain amount of time to begin with and then no longer displayed unless requested by the user and/or otherwise reactivated by the underlying logic. For example, the display of identifier 212 can be timed in some manner to initially be displayed for a defined period of time following the connection and then at least partially if not fully removed from the GUI display. Logic such as this can cause the "hidden" identifier 212 to reactivate/reappear after a specific timed hiatus, for example.

In certain implementations, if the user causes a pointing device (e.g., a mouse), to have its cursor pointed in the area or other nearby regions wherein identifier 212 was previously displayed, then logic can cause identifier 212 to be reactivated/redisplayed within GUI 210'. Certain implementations require that the pointer be within the region for a specific amount of time before the hidden identifier reappears. Thus, the identifier can be operatively configured to have an "auto-hide" capability. In other implementations, a more obvious button may be provided within GU 210' (or perhaps a keystroke defined) to allow the identifier 212 to be toggled on/off by the user.

These and other like implementations allow the user to initially notice that the GUI is associated with a remote session/device and then have the identifier 212 selectively disappear/reappear from the display. In certain implementations however, the ability to hide identifier 212 may itself be controlled. For example, for security or other reasons a system administrator or like person may establish and implement a policy by which a computer or network of computers must continuously or at least periodically display an identifier 212 such that the user(s) are kept aware that they are using a remote computer or like device.

In still other exemplary implementations, identifier 212 may include one or more selectable GUI objects and the like. For one example, see FIG. 3B, which depicts the connection bar identifier 212 of FIG. 3A in more detail. Here, within identifier 212 the remote connection is described or otherwise identified by name 304 (e.g., device and/or session name, etc.). Also provided is a selectable button 302 that is associated with a system menu that the user can view/interface with, a user selectable minimize toggle button 306, a user selectable full screen/tiled toggle button 308, and a user selectable close button 310. These and other like user selectable features can be provided to allow the user more access to the system menus, title bars, and min/max/close controls of applications and the like operating on the remote computer.

These are just a few examples of the information/functionality that can be provided with identifier 212. Indeed, in certain implementations, remote computer 50 can dynamically change the information within identifier 212 during the session. For example, if remote computer 50 is running on battery power, then information about the battery power available may be displayed. Thus, as the batteries are running high/low on charge, an applicable message may be displayed to the user through identifier 212. Practically any other useful information may be presented through identifier 212.

Reference is now made to FIG. 3C, which is an illustrative screen shot of a word processor GUI 320 that may be operatively opened within second desktop GUI 210', for example. Although not shown, the connection bar identifier 212 would normally occupy the area in and around dashed-line box 322. The reason connection bar identifier 212 is not shown here is to illustrate that, when displayed, identifier 212 is strategically positioned within a normally vacant region of the word processor program application's title bar 324. Thus, identifier 212 is preferably strategically positioned so as to not interrupt the user of the remote computing session.

With the various above-described exemplary implementations and others like them in mind, FIG. 5 illustrates an exemplary method 500 for displaying an identifier 212 in a generic remote session GUI 200, e.g., a desktop, application, and/or other like program module generated GUI.

In step 502, a first GUI is established and displayed by a local computer/session. In step 504, the user is allowed to initiate a session/connection to a remote computer, for example, using the first GUI. Next, in step 506, as a result of step 504 a second GUI is established by a remote computer/session and displayed by the local computer on its display screen. In step 508, selectively displayed within the second GUI is at least one identifier or like object that alerts the user that the second GUI is not associated with the local computer/session but rather it is associated with the remote computer/session.

In accordance with certain other aspects of the present invention, an identifier as described herein may also be employed to serve the user of a computer that is capable of having a local application or other like process GUI operate in a full screen or substantially full screen mode, such that another underlying local application or process GUI is essentially hidden from the user. Thus, for example, a local Internet browser application or word processing application may be displayed in full screen or substantially full screen mode over the local computer's operating system desktop. Here, the identifier included in the overlying GUI can be configured, for example, to alert the user that one or more underlying GUIs are also available. To assist the user in switching between various GUIs (local and/or remote operating), the identifier may include a user selectable inputs to open/close/min./max. or perhaps switch the GUIs at will. The identifier, which may have auto-hiding capabilities, may also be useful in identifying the program, file, and/or other information associated with the GUI. Thus, in certain implementations, the identifier may be selectively located/displayed in a manner that advantageously reduces interference with the GUI operation. This could be an improvement to the more traditional title bars, etc., that may reduce the effectiveness of the GUI operation.

Although some preferred implementations of the various methods and arrangements of the present invention have been illustrated in the accompanying Drawings and described in the foregoing Detailed Description, it will be understood that the invention is not limited to the exemplary implementations disclosed, but is capable of numerous rearrangements, modifications and substitutions without departing from the spirit of the invention as set forth and defined by the following claims.

What is claimed is:

1. A method comprising:
    displaying a first graphical user interface (GUI) on a display screen, the first GUI being associated with one or more programs operatively configured on a first computing device; and
    displaying a second GUI on said display screen over said first GUI, the second GUI being associated with one or more programs operatively configured on a second computing device that is operatively connected to said first computing device, and wherein said second GUI is displayed on substantially the full screen of said display screen and includes at least one identifier that identifies that said second GUI is not associated with said first computing device.

2. The method as recited in claim 1, wherein at least one of said first and said second GUIs is a desktop GUI associated with an operating system.

3. The method as recited in claim 1, wherein at least one of said first and said second GUIs is an application GUI associated with an application program.

4. The method as recited in claim 1, wherein said second GUI is displayed in full screen mode on said display screen, such that none of said first GUI is visible to said user.

5. The method as recited in claim 1, wherein said at least one identifier is selectively displayed for a defined period of time and then no longer displayed until reactivated.

6. The method as recited in claim 5, wherein said at least one identifier is reactivated after a defined period of time expires since said at least one identifier was last displayed.

7. The method as recited in claim 5, wherein said at least one identifier is reactivated after the user causes a pointing device controlled cursor to enter into a defined region of said second GUI.

8. The method as recited in claim 5, wherein said at least one identifier is reactivated after the user causes a pointing device controlled cursor to enter into a defined region of said second GUI and said cursor remains in said region for a definable period of time.

9. The method as recited in claim 1, wherein said at least one identifier is selectively displayed based on at least one user keyboard input.

10. The method as recited in claim 1, wherein said at least one identifier is selectively displayed by said program operatively configured on said second computing device.

11. The method as recited in claim 1, wherein said at least one identifier includes information identifying said second computing device.

12. The method as recited in claim 1, wherein said at least one identifier includes at least one user selectable feature that is operatively configured to provide at least one user input to said second computing device.

13. A method comprising:
    generating graphical user interface (GUI) data suitable for being displayed on a display screen, the GUI data being associated with one or more programs operatively configured on a computing device that is configurable to be operatively coupled to another computing device,
    wherein said another computing device is connected to said display screen and if displayed on said display screen said GUI data is configured to use substantially the full screen of said display screen, and
    wherein said GUI data includes data for displaying at least one identifier that identifies that said GUI data is associated with said computing device, and identifies the GUI data from other GUI data associated with one or more programs.

14. The method as recited in claim 13, wherein said GUI data includes desktop GUI data associated with an operating system running on said computing device.

15. The method as recited in claim 13, wherein said GUI data includes application GUI data associated with an application program running on said computing device.

16. A computer-readable medium having computer-executable instructions for performing acts comprising:
    displaying a first graphical user interface (GUI) on a display screen, the first GUI being associated with one or more programs operatively configured on a first computing device; and
    displaying a second GUI on said display screen over said first GUI, the second GUI being associated with one or more programs operatively configured on a second computing device that is operatively connected to said first computing device, and wherein said second GUI is displayed on substantially the full screen of said display screen and includes at least one identifier that identifies that said second GUI is not associated with said first computing device.

17. The computer-readable medium as recited in claim 16, wherein at least one of said first and said second GUIs is a desktop GUI associated with an operating system.

18. The computer-readable medium as recited in claim 16, wherein at least one of said first and said second GUIs is an application GUI associated with an application program.

19. The computer-readable medium as recited in claim 16, wherein said at least one identifier is selectively displayed for a defined period of time and then no longer displayed until reactivated.

20. The computer-readable medium as recited in claim 16, wherein said at least one identifier includes information identifying said second computing device.

21. The computer-readable medium as recited in claim 16, wherein said at least one identifier includes at least one user selectable feature that is operatively configured to provide at least one user input to said second computing device.

22. A computer-readable medium having computer-executable instructions for performing acts comprising:
   generating graphical user interface (GUI) data suitable for being displayed on a display screen, the GUI data being associated with one or more programs operatively configured on a computing device that is configurable to be operatively coupled to another computing device, wherein said another computing device is connected to said display screen and generating said GUI data such that if displayed on said display screen said GUI data uses substantially the full screen of said display screen, and
   generating said GUI data to include data for displaying at least one identifier that identifies that said GUI data is associated with said computing device, and identifies the GUI data from other GUI data associated with one or more programs.

23. The computer-readable medium as recited in claim 22, wherein said GUI data includes desktop GUI data associated with an operating system running on said computing device.

24. The computer-readable medium as recited in claim 22, wherein said GUI data includes application GUI data associated with an application program running on said computing device.

25. A system comprising:
   a display screen;
   a communication link;
   a first computing device operatively coupled to said display screen and said communication link, and configured to display a first graphical user interface (GUI) on said display screen, the first GUI being associated with one or more programs running on said first computing device;
   a second computing device operatively coupled to said communication link and thusly said first computing device, said second computing device being configured to display a second GUI on said display screen over said first GUI, the second GUI being associated with one or more programs operatively configured on said second computing device, and wherein said second GUI is displayed on substantially the full screen of said display screen and includes at least one identifier that identifies that said second GUI is not associated with said first computing device.

26. The system as recited in claim 25, wherein at least one of said first and said second GUIs is a desktop GUI associated with an operating system.

27. The system as recited in claim 25, wherein at least one of said first and said second GUIs is an application GUI associated with an application program.

28. The system as recited in claim 25, wherein said second GUI is displayed in full screen mode on said display screen, such that none of said first GUI is visible to said user.

29. The system as recited in claim 25, wherein said at least one identifier is selectively displayed for a defined period of time and then no longer displayed until reactivated.

30. The system as recited in claim 29, wherein said at least one identifier is reactivated after a defined period of time expires since said at least one identifier was last displayed.

31. The system as recited in claim 29, wherein said at least one identifier is reactivated after the user causes a pointing device controlled cursor to enter into a defined region of said second GUI.

32. The system as recited in claim 29, further comprising:
   a pointing device operatively coupled to said first computing device; and
   wherein said at least one identifier is reactivated after the user causes a pointing device controlled cursor to enter into a defined region of said second GUI and said cursor remains in said region for a definable period of time.

33. The system as recited in claim 25, wherein said at least one identifier is selectively displayed based on at least one user keyboard input.

34. The system as recited in claim 25, wherein said at least one identifier is selectively displayed by said second computing device.

35. The system as recited in claim 25, wherein said at least one identifier includes information identifying said second computing device.

36. The system as recited in claim 25, wherein said at least one identifier includes at least one user selectable feature that is operatively configured to provide at least one user input to said second computing device.

37. An apparatus comprising:
   a computing device capable of being operatively connected to at least one other computing device through an interconnecting communication channel, said computing device having logic configured to generate graphical user interface (GUI) data associated with one or more programs suitable for display on a display screen coupled to said other computing device, wherein if displayed on said display screen said GUI data is configured to use substantially the full screen of said display screen, and wherein said GUI data includes data for displaying at least one identifier that identifies that said GUI data is associated with said computing device, and identifies the GUI data from other GUI data associated with one or more programs.

38. The apparatus as recited in claim 37, wherein said GUI data includes desktop GUI data associated with operating system logic configured on said computing device.

39. The apparatus as recited in claim 37, wherein said GUI data includes application GUI data associated with application program logic configured on said computing device.

40. A method comprising:
   displaying a first graphical user interface (GUI) on a display screen, the first GUI including a first object associated with a first program; and
   displaying a second GUI on said display screen over said first GUI, the second GUI including a second object that is the same as the first object associated with a second program, and wherein said second GUI is displayed on substantially the full screen of said display screen and includes at least one identifier that identifies that said second GUI is not associated with said first program.

41. The method as recited in claim 40, wherein at least one of said first and said second GUIs is a desktop GUI associated with an operating system.

42. The method as recited in claim 40, wherein at least one of said first and said second GUIs is an application GUI associated with an application program.

43. The method as recited in claim 40, wherein said second GUI is displayed in full screen mode on said display screen, such that none of said first GUI is visible to said user.

44. The method as recited in claim 40, wherein said at least one identifier is selectively displayed for a defined period of time and then no longer displayed until reactivated.

45. The method as recited in claim 44, wherein said at least one identifier is reactivated after a defined period of time expires since said at least one identifier was last displayed.

46. The method as recited in claim 44, wherein said at least one identifier is reactivated after the user causes a pointing device controlled cursor to enter into a defined region of said second GUI.

47. The method as recited in claim 44, wherein said at least one identifier is reactivated after the user causes a pointing device controlled cursor to enter into a defined region of said second GUI and said cursor remains in said region for a definable period of time.

48. The method as recited in claim 40, wherein said at least one identifier is selectively displayed based on at least one user keyboard input.

49. The method as recited in claim 40, wherein said at least one identifier includes information identifying said second program.

50. The method as recited in claim 40, wherein said at least one identifier includes at least one user selectable feature that is operatively configured to provide at least one user input to said second program.

51. The method as recited in claim 40, wherein said first program and said second program are operatively running on at least one processing unit within a single computer.

52. The method as recited in claim 40, wherein said first program and said second program are operatively running on at processing units within different computers.

53. A computer readable medium having computer implementable instructions for performing acts comprising:
   displaying a first graphical user interface (GUI) on a display screen, the first GUI including a first object associated with a first program; and
   displaying a second GUI on said display screen over said first GUI, the second GUI including a second object that is the same as the first object associated with a second program, and wherein said second GUI is displayed on substantially the full screen of said display screen and includes at least one identifier that identifies that said second GUI is not associated with said first program.

54. The computer readable medium as recited in claim 53, wherein at least one of said first and said second GUIs is a desktop GUI associated with an operating system.

55. The computer readable medium as recited in claim 53, wherein at least one of said first and said second GUIs is an application GUI associated with an application program.

56. The computer readable medium as recited in claim 53, wherein said second GUI is displayed in full screen mode on said display screen, such that none of said first GUI is visible to said user.

57. The computer readable medium as recited in claim 53, wherein said at least one identifier is selectively displayed for a defined period of time and then no longer displayed until reactivated.

58. The computer readable medium as recited in claim 57, wherein said at least one identifier is reactivated after a defined period of time expires since said at least one identifier was last displayed.

59. The computer readable medium as recited in claim 57, wherein said at least one identifier is reactivated after the user causes a pointing device controlled cursor to enter into a defined region of said second GUI.

60. The computer readable medium as recited in claim 57, wherein said at least one identifier is reactivated after the user causes a pointing device controlled cursor to enter into a defined region of said second GUI and said cursor remains in said region for a definable period of time.

61. The computer readable medium as recited in claim 53, wherein said at least one identifier is selectively displayed based on at least one user keyboard input.

62. The computer readable medium as recited in claim 53, wherein said at least one identifier includes information identifying said second program.

63. The computer readable medium as recited in claim 53, wherein said at least one identifier includes at least one user selectable feature that is operatively configured to provide at least one user input to said second program.

64. The computer readable medium as recited in claim 53, wherein said first program and said second program are operatively running on at least one processing unit within a single computer.

65. The computer readable medium as recited in claim 53, wherein said first program and said second program are operatively running on at processing units within different computers.

* * * * *